United States Patent [19]

Lerner et al.

[11] Patent Number: 5,461,475
[45] Date of Patent: Oct. 24, 1995

[54] BINARY OPTICAL SPECTRUM ANALYZER

[75] Inventors: Jeremy Lerner, Culver City; Taiwei Lu; Shing-Hong F. Lin, both of Torrance; Andrew Kostrzewski; Hung Chou, both of Garden Grove, all of Calif.

[73] Assignee: Physical Optics Corporation, Torrance, Calif.

[21] Appl. No.: 191,056

[22] Filed: Feb. 2, 1994

[51] Int. Cl.$^6$ .................................................. G01J 3/00
[52] U.S. Cl. .......................... 356/300; 356/303; 356/326
[58] Field of Search .................................. 356/300, 303, 356/326, 328; 359/246, 10; 364/822

[56] References Cited

U.S. PATENT DOCUMENTS

| | | | |
|---|---|---|---|
| 3,717,412 | 2/1973 | Takuma et al. | 356/303 |
| 5,039,210 | 8/1991 | Welstead et al. | 359/36 |

OTHER PUBLICATIONS

Sheng et al, "Optical $N^4$ Implementation of a Two Dimensional Wavelet Transform," Optical Engineering, Sep. 1992, vol. 31, #9, pp. 1859–1863.

Primary Examiner—Vincent P. McGraw
Assistant Examiner—K. P. Hantis
Attorney, Agent, or Firm—Nilles & Nilles

[57] ABSTRACT

Apparatus for analyzing a spectral signature, including: a light source; a spatial light modulator connected to the light source, the spatial light modulator modulating light from the light source in accordance with spatial features of the spectral signature; an optic system upon which modulated light from the spatial light modulator is incident, the optic system filtering the modulated light; a hologram illuminated with filtered, modulated light from the optic system, the hologram outputting an optical identification of the spectral signature; and a detector upon which the optical identification is incident, the detector detecting the optical identification.

28 Claims, 4 Drawing Sheets

BINARY OPTICAL SPECTRUM ANALYZER

BACKGROUND OF THE INVENTION

1. Field of Use

This invention pertains to the analysis of spectra to determine the presence or absence of particular constituents in media undergoing evaluation. More particularly, this invention relates to the fast, real-time analysis of spectra.

2. Description of the Related Art

It is the nature of testing, particularly testing in disciplines where even the slightest error is unacceptable, to employ a variety of tests a number of times until the chance of error has been virtually eliminated. The costs of testing and retesting until all possible tests are exhausted is great and, unfortunately, is often precipitated by none other than the desire to avoid liability if the test results are wrong. At the same time, it is commonly necessary, and indeed crucial, to determine the constituents, chemical or other, of particular media. "Constituents" may include molecular, elemental, structural, crystalline, or physical characteristics, and which may be represented by an XY plot. Spectrometers or a variety of devices such as mass spectrometers, NMR and electron spin resonance device and others, are means commonly employed to determine the chemical and physical characteristics of media.

The output of a spectrometer is a "spectral signature" which is a characteristic complex curve or spectrum having peaks and valleys of various amplitudes, and which, in the absence of noise, are identifiable by the operator as being associated with a particular composition. A "spectrum" may be an XY plot where the X axis could be intensity, for example, transmission, absorbance or relative counts, polarization, degrees of temperature or angle, energy or force. The Y axis could be wavelength units, wavenumber units, mass, time, force, energy, magnetic movement, or gauge. When a number of constituents having similar characteristics are to be determined, it becomes more difficult to identify and distinguish between some or all of them. Furthermore, that task can be made almost impossible in the presence of significant noise. A variety of commonly used methods, including Fourier transform analysis, on occasion may be used to improve the signal-to-noise ratio of such a signal but all current methods make the testing process more expensive because they require the skilled use of additional equipment and are relatively slow.

Furthermore, the usual course in the state of the art is to run a full battery of post spectroscopic tests for all conceivable constituents so that none are missed. These tests confirm not only the presence or absence of a particular constituent but its exact quantity and therefore are costly and time consuming. Such comprehensive testing is cost effective where the constituent tested for is in fact found to be present but is wasteful where the constituent is absent altogether.

SUMMARY OF THE INVENTION

It would be of great benefit to be able to quickly, inexpensively, and reliably identify the presence or absence of a particular constituent prior to running conventional post-spectroscopic tests in order to eliminate the necessity of a substantial number of these tests.

The present invention is a smart optical spectrum analyzer which fulfills the previously unfulfilled need to accurately determine the constituents of a particular medium under test while using fewer tests. The present invention is able to determine the presence or absence of a particular constituent far more quickly and inexpensively than is currently possible and makes unnecessary the performance of further conventional analysis for those constituents which are confirmed to be absent from the media.

The present invention comprises a combination of light source means, spatial light modulating means, lens means, holographic means, and detector means in optical alignment. In one embodiment, the output of a conventional spectrometer or other spectroscopic device which produces a conventional characteristic complex curve or spectrum representing the constituents of the medium under spectral test is input to the spatial light modulating means which is illuminated with the light source. The spatial light modulating means outputs light modulated in accordance with the spectrometer output to optic means which filters the light to eliminate higher orders. The filtered light is then incident upon a volume hologram recorded with multiplexed output symbols or information which corresponds to the spatial features of the constituents of the medium under test. The output of the hologram is then incident upon detector means which in one embodiment may be a diffuser and a CCD camera, the output of which may be fed to post processor means including thresholding means. In another embodiment, a detector array may be used instead of the diffuser and camera to detect the output information.

The volume hologram may be recorded using a series of masks in the reference beam corresponding to or replicating the spatial features of the spectral signature of each of the particular constituents of the medium under test. A second mask may be used, in conjunction with a diffuser, in the object beam to record in the hologram within the area of the hologram illuminated through the first mask, a predetermined output symbol or information for each of the possible constituents. The resulting hologram thus is recorded with the output information within the area defined by the first mask. Upon the hologram being illuminated within that particular area during playback, the particular output symbol recorded within that area is output to the user thus identifying the constituent present.

The multiplexed hologram enables extremely fast identification of each of the constituents in the present invention. In particular, the output from a spectroscopic device may be fed into the spatial light modulator which in one embodiment may comprise a liquid crystal television (LCTV). The LCTV is illuminated by the laser light which is modulated by the LCTV in accordance with the spatial features of the spectroscopic output (i.e., characteristic peaks and valleys). The modulated light is then cleaned up by the optic means which in one embodiment may comprise a 4f lens system. The output of the lens system is incident upon a hologram. The hologram simultaneously outputs to the diffuser the output symbol or information corresponding to a particular constituent which may then be directly viewed by the tester. Alternatively, the CCD camera may detect the output at the diffuser and feed that signal to a post processor such as a PC. The PC may run thresholding tests to determine whether the signal is strong enough to constitute an accurate signal and to reject weak signals.

The present invention permits the almost real time determination of the presence or absence of constituents in a spectral signature. Where a particular constituent is confirmed to be present, conventional tests may be run to determine its quantity. However, where the absence of a constituent is confirmed, no further tests need be done.

DESCRIPTION OF THE PREFERRED EMBODIMENTS

Figure 1:
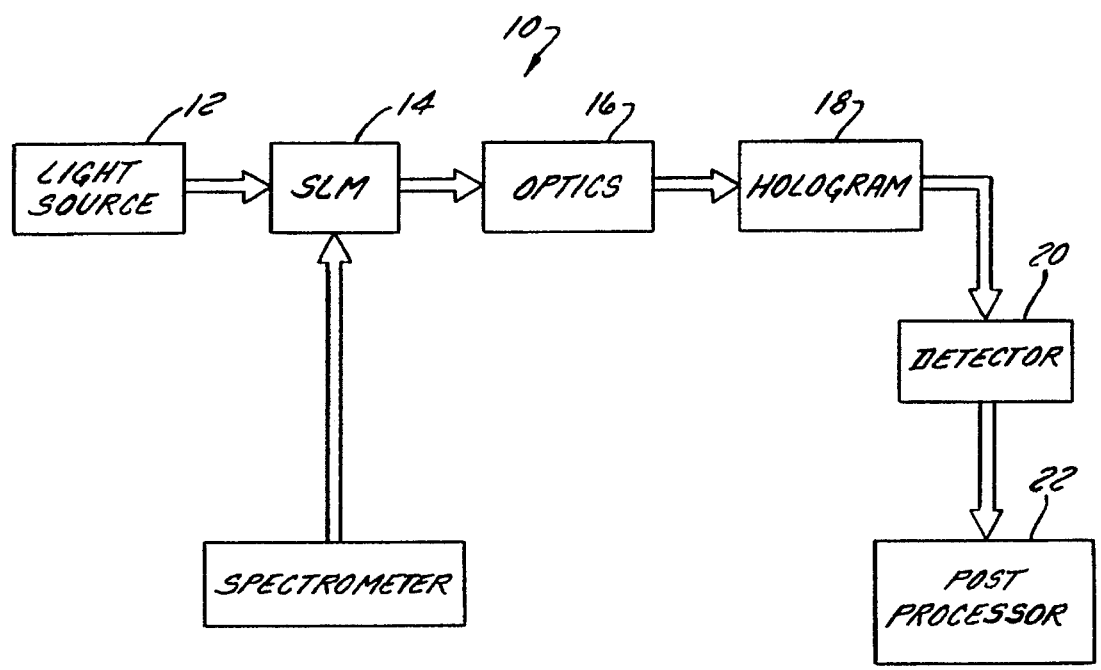
FIG. 1 is a block diagram of the spectra analyzer of the present invention.

Referring now to FIG. 1, a block diagram of the smart optical spectra analyzer 10 of the present invention is presented. The analyzer 10 may comprise light source 12, spatial light modulator (SLM) 14, optics 16, hologram 18, detector 20, and, if desired, post-processor 22. Also shown is a block representing a standard spectroscopic device such as a spectrometer or other device that produces a spectrum to be analyzed.

Figure 2A:
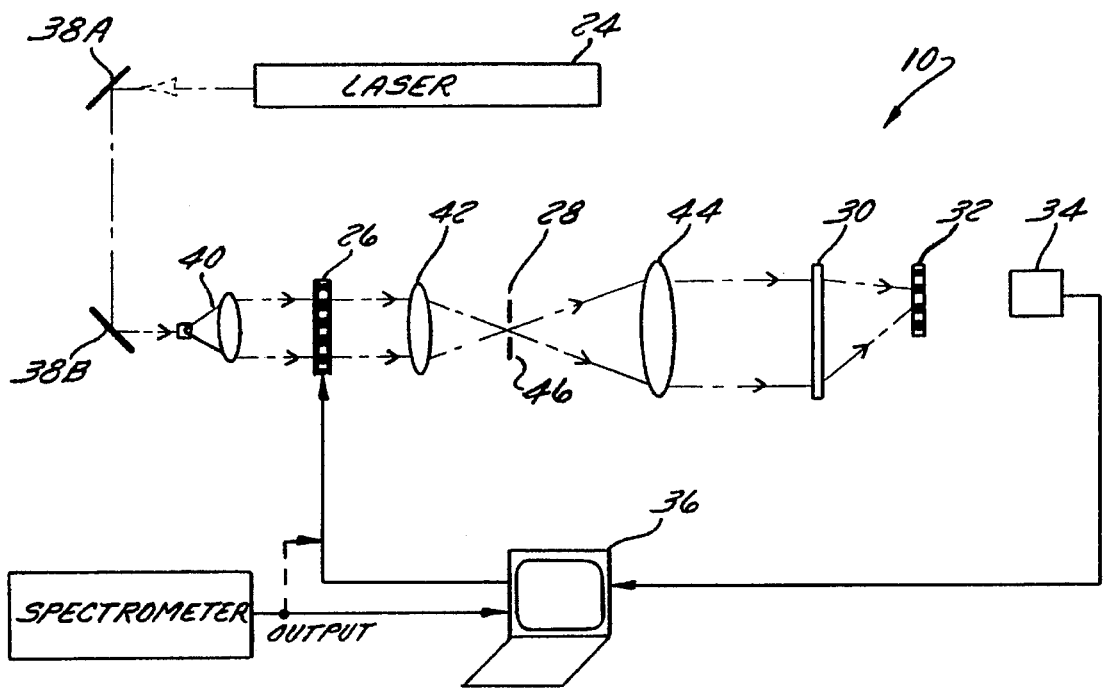
FIGS. 2A and B are schematics of the architecture of the smart optical spectra analyzer of the present invention using a diffuser-camera detector and a detector array, respectively.

Referring to FIG. 2A, the components of the smart optical spectra analyzer 10 of the present invention are depicted schematically. The analyzer comprises a light source such as laser 24, spatial light modulating means such as LCTV 26, optics such as 4f lens system 28, hologram 30, detector means such as diffuser 32 and CCD camera 34, and, if desirable, post-processor 36. These components are in optical alignment along an optical path.

LCTV 26 functions as a television in that it produces a visual output in response to an electrical input. In this case, LCTV 26 also receives a light source input from laser 24 as shown in FIG. 2A. Thus, light from laser 24 is modulated by LCTV 26 in response to spectral signature input signals from PC 36 and the spectrometer, thereby producing a visual output which is transmitted to hologram 30 via lens system 28.

The laser 24 may preferably comprise a conventional laser such as an argon or other suitable laser. The laser beam may be directed as necessary using conventional mirrors 38A and 38B and to conventional collimation optics 40 which may comprise a standard microscopic objective spatial filter such as a pinhole and a collimating lens. The collimated light is incident upon LCTV 26 which may comprise any suitable device which modulates light incident thereon in accordance with an input signal, such as magnetooptic SLMs, ferro-electric SLMs (FLC), acoustooptical SLMs (AO), deformable mirrors (DMD), and symmetrical self-electrooptic effect devices (SEED). If, for example, an LCTV is used, the LCTV may comprise a commercially available LCTV for TV display comprising a grid pattern of addressing wires sandwiching liquid crystal. As is known, the addressing wires define pixels which may be turned on or off depending on the addressing wires selected. In this way, individual pixels are made transparent or opaque and create an image.

The 4f lens system 28 is a standard lens system comprising a first lens 42 having focal length $f_1$ and a second lens 44 having focal length $f_2$ and a pinhole 46 between the lenses. The pinhole is separated from lens 42 by a distance equal to $f_1$ and from lens 44 by a distance equal to $f_2$. The lenses may be of unequal size. The 4f lens system 28 may preferably be spaced from the LCTV 26 by the distance $f_1$. Optical means other than lenses may be used as well including conventional holographic optical elements (HOEs) or binary optics or prisms.

Separated from the 4f lens system 28 by the distance $f_2$ is hologram 30 which may preferably comprise a volume hologram recorded with multiplexed sets of holographic fringes, each set representing the output information corresponding to one of the constituents to be determined. Consistent with the simplicity of the instant invention, the multiplexed hologram 30 preferably comprises multiplexed continuous holographic recordings of the desired output information for each of the constituents. This greatly simplifies recording of the hologram and alignment of the components of the system.

The hologram 30 may be of a different size than the LCTV 26. In particular, the planar surface of the hologram 30 which is perpendicular to the optical path may have a different area than the planar surface of LCTV 26, depending upon the relative sizes of lens 42 and lens 44. If lens 44 is larger than lens 42, hologram 30 may be larger than LCTV 26 accordingly.

The diffuser 32 of the detector means 20 is located in the optical path at the focal point or output plane of the hologram 30. The diffuser may comprise a standard ground glass diffuser having normal diffusion characteristics or may comprise a grin-type diffuser based on volume holographic materials which may shape the diffused beam as disclosed in application U.S. Ser. No. 848,703, filed Mar. 9, 1992, now U.S. Pat. No. 5,365,354 which is a continuation of U.S. Ser. No. 591,801.

The CCD camera 34 monitors the diffuser 32. In other words, diffuse light from the diffuser 32 is incident the input of CCD camera 34. The output of the camera may be fed to a standard frame grabber (not shown) and then to a post processor 22 such as PC 36 which may include standard thresholding software and circuitry. The PC may also be used to control the LCTV 26 in accordance with inputs from a spectroscopic device.

Figure 2B:
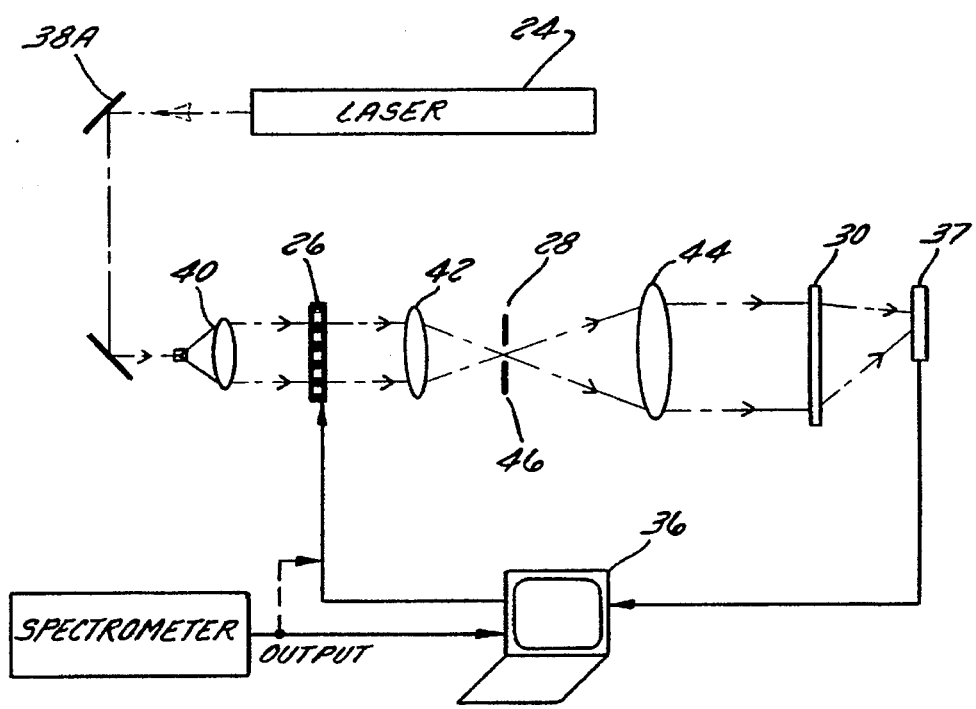

In place of the diffuser and CCD camera, a detector array 37 as seen in FIG. 2B may be placed at the focal point of the hologram 30. The output of that detector array may be fed to a conventional display device.

In operation, the output of a conventional spectrometer or other spectrum generating device is input to LCTV 26 either through a standard interface or through PC 36 which will, in real time, retransmit the data stream to LCTV 26 through conventional LCTV controller circuitry. If no PC is used, then an interface such as an LCTV controller board is needed to generate the appropriate video signal for the LCTV 26. As is well understood in the art, the video signal input to the LCTV 26 generates a corresponding image in the LCTV 26.

The light beam from laser 24 is redirected 180° by conventional mirrors 38A and 38B and is incident upon collimation optics 40. Redirection or folding of the optical path of the beam is, of course, not necessary, but makes the analyzer more compact. Collimation optic 40 diverges the beam and collimates it, and thereby increases contrast ratio and sensitivity of the device.

The collimated light is then incident upon LCTV 26 and modulated in accordance with the image therein. Of course, the larger the LCTV 26 the more information is imparted to the laser beam incident the LCTV 26. Although LCTV devices are usually quite slow (30 frames/sec), and other devices which are faster may be used, such as FLCs, such devices are significantly more expensive than LCTVs. The modulated and collimated light then passes through lens 42, pinhole 46, and lens 44 of the 4f lens system 28. The lens 42 focuses the light to the pinhole, the pinhole permitting only one diffraction order to pass, and the lens 49 recollimates the light before it is incident upon the hologram 30. Consequently, the 4f lens system eliminates the high frequency components of the image eliminating all but the selected order (e.g., zeroth order) and this insures that any diffraction caused by the grid pattern of addressing wires in the LCTV is filtered out. In addition to filtering the image, the 4f lens system may also be used to enlarge the image. Typically, the surface area of an LCTV is rather small (approximately 1 inch square) and it may be preferable to use a hologram substantially larger than the LCTV. This can be accomplished through an appropriately proportioned 4f lens system by making lens 44 larger than lens 42. This makes the analyzer of the present invention extremely flexible and user friendly.

Figure 3:
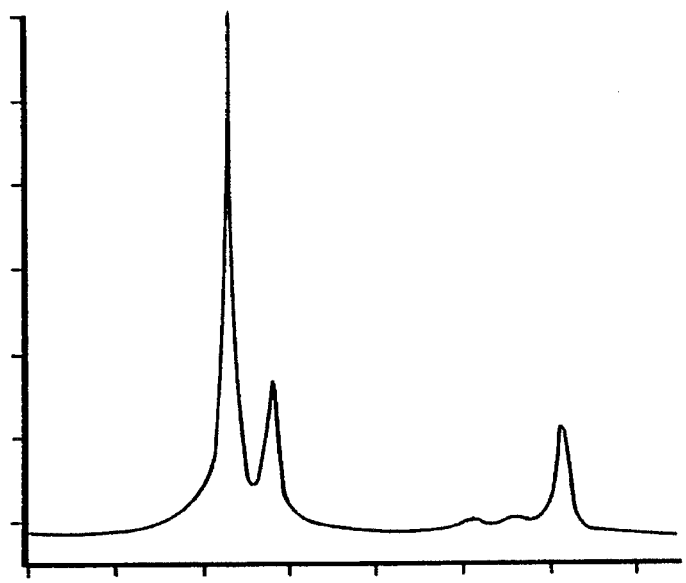
FIG. 3 is a schematic of the spatial characteristics of a spectral signature at the output of a spectroscopic device.

The filtered light output from the 4f lens system 28 is incident upon the hologram 30 which is illuminated with the image generated by the LCTV 26. A typical image is that depicted in FIG. 3 which is a conventional spectrometer output comprising a complex curve of peaks and valleys representing the spectral signature of a constituent of the medium under spectral test. Thus, assuming the spectrometer output depicted in FIG. 3 is input to the LCTV 26 and imaged in the LCTV, the area of illumination of the hologram 30 will have the shape of the area under the curve in FIG. 3.

Upon being illuminated in the shape of the image generated in LCTV 26, the portion of the hologram that is illuminated diffracts that light, in the shape of the output symbol or information recorded therein for that particular constituent, upon diffuser 32. The output information or symbol is viewable at diffuser 32 by the naked eye.

Preferably, however, CCD camera 34 monitors or films the diffuser 32 and the output of the camera may be fed to a frame grabber to select one frame at a time. If the diffuser is of a novel grin-type diffuser, its output can be sculpted to exactly fit the input to the CCD camera thereby keeping losses to a minimum. Each frame may be fed to PC 36 which compares the frame to a reference signal. If the frame signal is too weak it is rejected. If the frame signal is satisfactory, it is output to a display such as a TV or other monitor or to circuitry which sets off an alarm or to another device which initiates other activity based on the signal. Exactly how the signal is used is arbitrary and will vary from application to application.

If a detector array 37 is used at the output plane of the hologram 30 instead of diffuser 32 and CCD camera 34, higher detection speeds may be achieved because the detector array 37 operates on the order of 10 ns as opposed to 30 frames/sec for the CCD camera. This increased speed will not likely be fully realized however because the limiting speed in the system will then be the speed at which the LCTV can generate images. In any case, the output of the detector array 37 may then be fed directly to PC 36 or other processing means and/or display means standard in the art suitable for a particular application.

Thus, it can be seen that the spectra analyzer of the present invention provides the user with instantaneous identification of the constituents represented by the conventional spectrometer output which is input to the analyzer 10 at the LCTV 26. There is virtually no delay from the time that the information is input to the analyzer 10 to the time that an identification is made and output to the user, even in the presence of substantial noise.

The present invention is capable of outputting the correct constituent identification even in the presence of approximately 1:1 noise. The hologram 30 inherently is a strong noise filter.

The following explanation of how the hologram 30 is recorded will assist in understanding how the spectra analyzer 10 insures that proper identification of the constituents of the spectrometer output is made.

Figure 4:
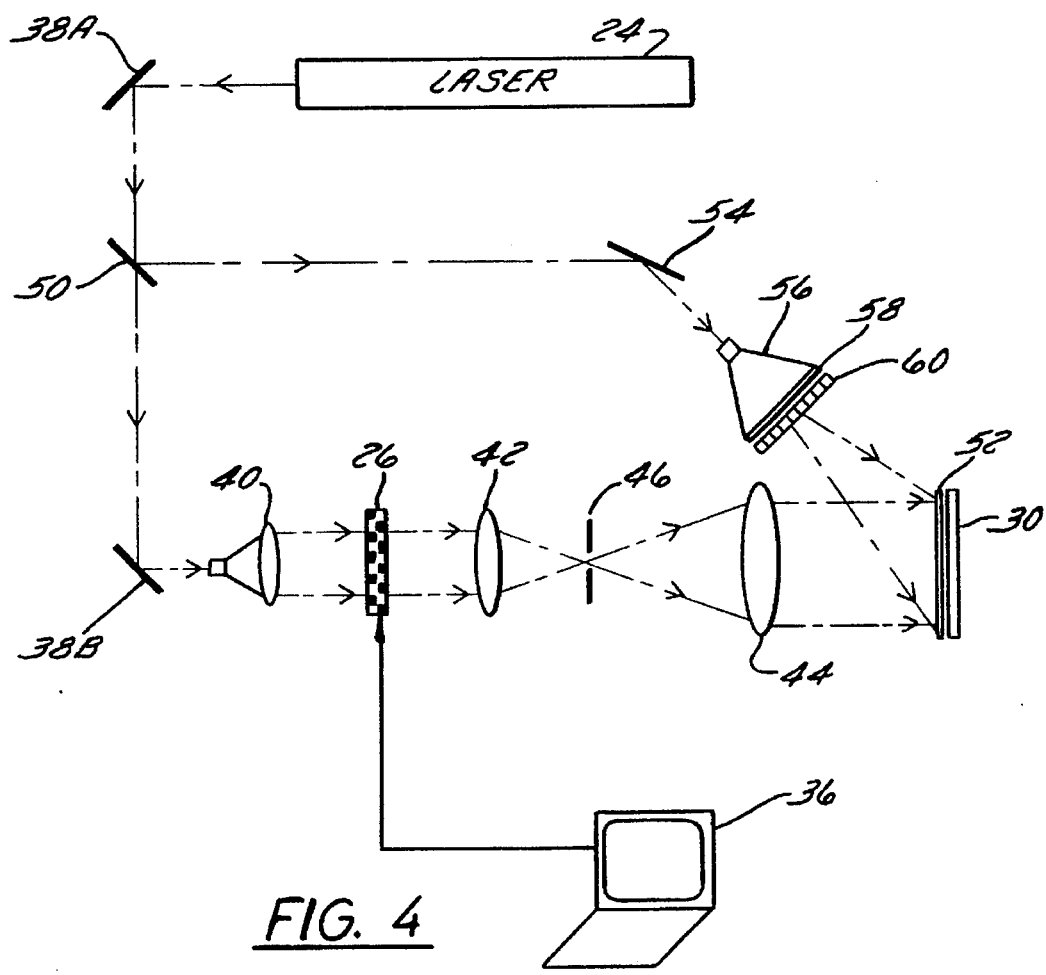
FIG. 4 is a schematic of the recording architecture of the hologram of the spectra analyzer of the present invention.

In keeping with the simplicity of the present invention, essentially the same set up disclosed in FIGS. 2A and B may be used for recording of the hologram 30. Referring to FIG. 4, the set-up shown may be the same as that in FIGS. 2A and B except that the detecting means 20 including the diffuser 32 and CCD camera 34, or in the alternative, the detector array 37, are not used. Although the LCTV need not be used either, it may remain in the recording set-up.

Figure 5A:
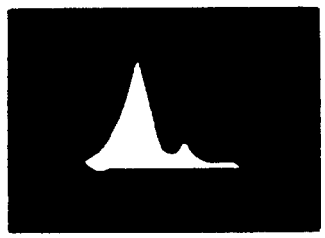
FIGS. 5A and B are schematics of reference beam masks for recording the hologram.

A beam splitter 50 is used to split the laser beam into an object beam and a reference beam. The reference beam is redirected by conventional mirror 38B and passes through collimation optics 40, LCTV 26, lens 42, pinhole 46, and lens 44 as before. A mask 52, as seen in FIG. 5A, having therein a cut-out portion in the shape of the spectral signature (see FIG. 3 for example) of a particular constituent to be determined is placed in front of the hologram 30, which at this point is simply an unrecorded plate of holographic material such as dichromated gelatin (DCG). The mask may be created by photographing the output of a spectrometer and using standard graphic processes to create the mask. That same shape is input to LCTV 26. This is done so that LCTV 26 may be left in the set-up for convenience purposes. Otherwise, it should be understood that LCTV 26 is not necessary to record the hologram 30.

Figure 6A:
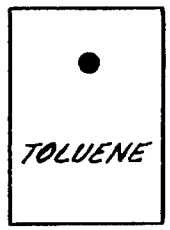
FIGS. 6A and B are schematics of the object beam masks for recording the hologram.

The object beam created by the beam splitter 50 is redirected by conventional mirror 54 which directs the object beam to conventional collimation optics 56 having adjacent thereto a second mask 58 and a diffuser 60. Mask 58 contains the output symbol or information to be output to the user to identify the presence or absence of a particular constituent as seen in FIG. 6A. FIG. 6A is an example of the information that may be used in mask 58, in this case, a dot and the word "toluene." The object beam that passes through the collimation optics 56 and mask 58 is then diffused by diffuser 60 onto reference beam mask 52 where the object beam interferes with the reference beam to record hologram 30 in conventional manner. Mask 52 delimits the portion of hologram 30 that is illuminated to the shape shown in FIG. 5A in this example. The information in mask 58 is thereby recorded only within the illuminated portion of the hologram 30.

This process is repeated for each constituent desired to be determined by replacing masks 52 and 58 with the appropriate masks, containing the appropriate spectral signature, for each constituent. DCG volume holography is particularly well suited to producing such high diffraction efficiency and low noise multiplexed holograms.

Figure 5B:
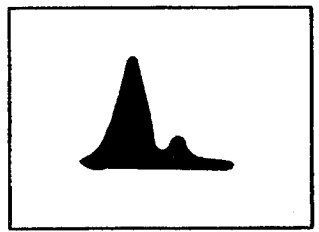
Figure 6B:
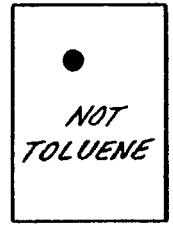

A second recording can be made in the hologram 30 for each constituent, which is essentially the negative or reciprocal of the first recording. For example, for toluene, mask 52 during a first recording would comprise the mask shown in FIG. 5A and mask 58 would comprise the mask shown in FIG. 6A. As a back-up, and to confirm for the user those instances where a constituent, such as toluene, is not present, mask 52 may comprise the mask shown in FIG. 5B and mask 58 may comprise the mask shown in FIG. 6B so that the "not toluene" output information is output to the user. It can be appreciated that the output information is arbitrary and may be chosen to suit virtually any set of circumstances.

The above mask encoding scheme uses the area-encoding method which records binary patterns on the hologram plate. By controlling the exposure time and the processing environment, we can modulate the diffraction efficiency of the hologram such that intensity, phase, and polarization encoding techniques can be combined to fully use the dynamic range of the hologram materials.

Figure 7:
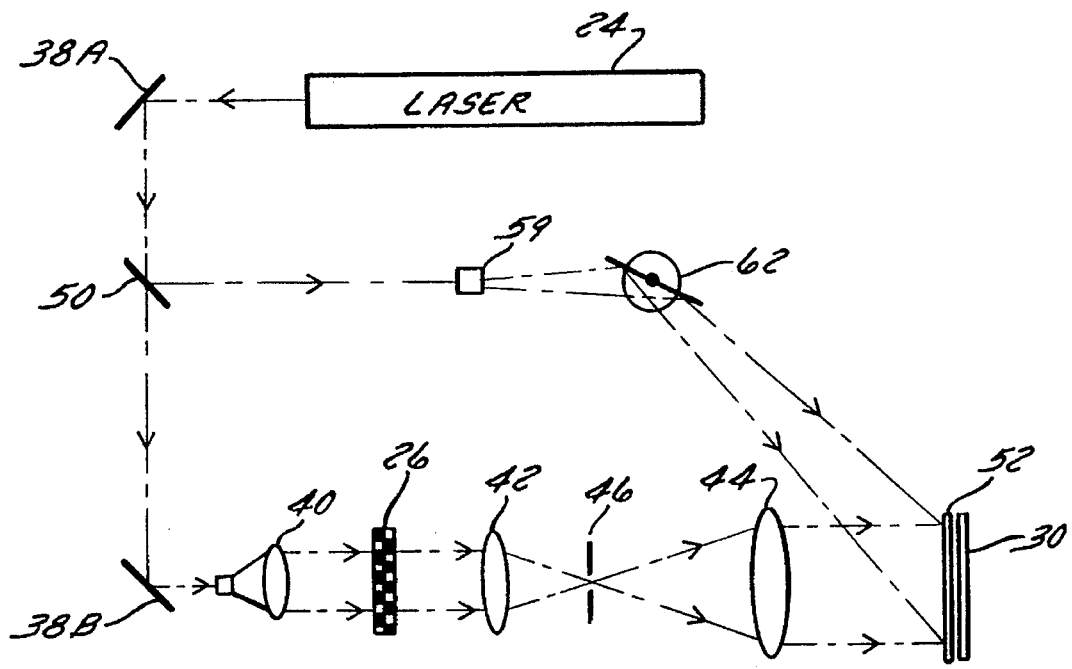
FIG. 7 is a schematic of alternative recording structure architecture of the hologram of the smart optical spectra analyzer of the present invention.
Figure 8:
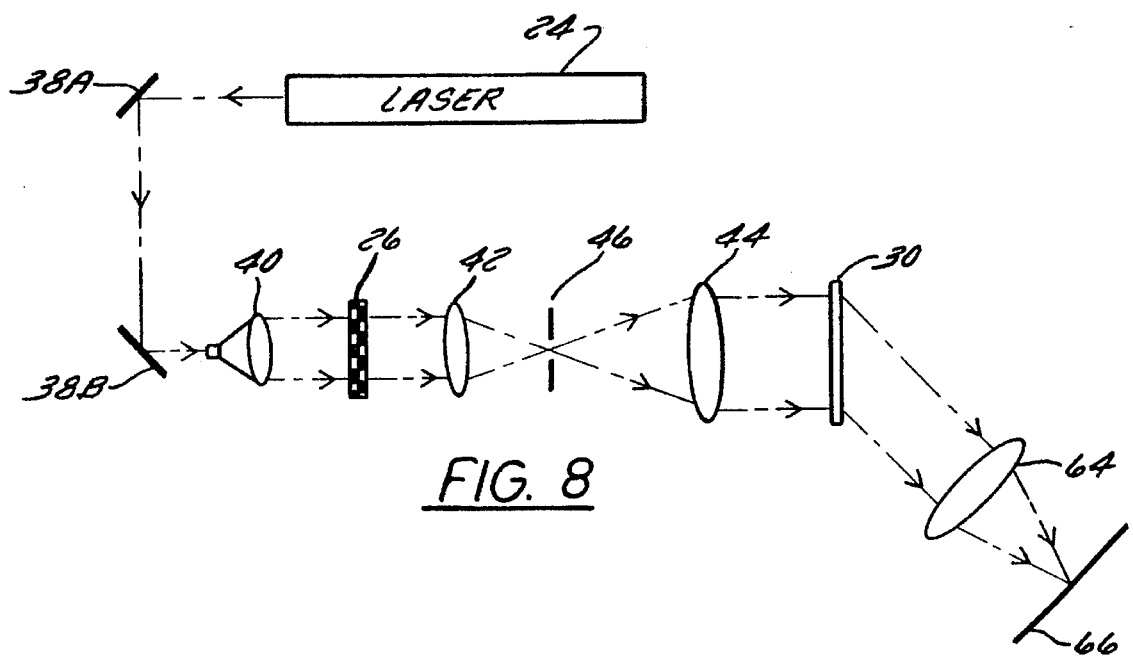
FIG. 8 is a schematic of alternative playback structure architecture of the analyzer of the present invention.

Seen in FIG. 7 is an alternative recording arrangement wherein the mirror 54, collimation optics 56, mask 58, and diffuser 60 combination is replaced with a microscope objective 59, and a rotating mirror stage 62. In this case, the microscope objective expands the beam and the angle of the mirror 62 is altered slightly from one recording to the next for each reference mask 52 representing the spectral signature of each constituent to be determined. In this way, a spot is recorded at different locations on the hologram 30 for each constituent. In use, when the hologram 30 is illuminated by laser light modulated by LCTV 26 in the shape of a spectral signature of a particular constituent in the medium, a lens 64, as seen in FIG. 8, may be used to focus the light diffracted from the illuminated portion of the hologram 30 into a spot on a detector 66. The location of the spot on the detector may then be interpreted by a computer in accordance with a predetermined code correlating a specific location on the detector to a particular constituent. In the alternative, each spot may be focused to a different location on a detector array and each detector may be connected to a separate device which then provides a signal to the user or to other devices.

It is to be understood that embodiments of the present invention not disclosed herein are fully intended to be within the scope of the claims.

We claim:

1. Apparatus for analyzing a spectral signature, comprising:

a light source;

a spatial light modulator connected to the light source, the spatial light modulator modulating light from the light source in accordance with spatial features of the spectral signature;

an optic system upon which modulated light from the spatial light modulator is incident, the optic system filtering the modulated light;

a hologram illuminated with filtered, modulated light from the optic system, the hologram i) including a binary pattern recorded therein and ii) outputting an optical identification of the spectral signature by diffracting the filtered, modulated light through the binary pattern; and a detector upon which the optical identification is incident, the detector detecting the optical identification.

2. The apparatus as defined in claim 1, wherein the light source includes a laser.

3. The apparatus as defined in claim 1, wherein the spatial light modulator includes a liquid crystal television.

4. The apparatus as defined in claim 1, wherein the optic system includes a 4f lens system.

5. The apparatus as defined in claim 1, wherein the hologram is a volume hologram.

6. The apparatus as defined in claim 1, wherein the detector includes a diffuser.

7. The apparatus as defined in claim 1, wherein the detector includes a diffuser and a camera monitoring the diffuser.

8. The apparatus as defined in claim 1, wherein the detector includes a detector array.

9. The apparatus as defined in claim 1, wherein the hologram includes a plurality of binary patterns recorded therein and outputting an optical identification includes outputting a plurality of optical identifications of the spectral signature by diffracting the filtered, modulated light through the plurality of binary patterns.

10. Apparatus for analyzing a spectral signature, comprising:

a laser;

a liquid crystal television connected to the laser, the liquid crystal television modulating light from the laser in accordance with spatial features of the spectral signature;

a 4f lens system upon which modulated light from the liquid crystal television is incident, the 4f lens system filtering unwanted diffraction orders from the modulated light;

a volume hologram having a focal plane, the volume hologram i) being illuminated with the filtered, modulated light from the 4f lens system, ii) including a binary pattern recorded therein and iii) outputting an optical identification of the spectral signature by diffracting the filtered, modulated light through the binary pattern;

a diffuser located at the focal plane of the hologram, the optical identification being incident upon the diffuser; and a camera upon which light from the diffuser is incident, the camera monitoring the optical identification.

11. The apparatus as defined in claim 10, wherein an output from the camera is input to processor and compared to a reference signal.

12. The apparatus as defined in claim 10, wherein the volume hologram is prerecorded with the optical identification within an area of the volume hologram illuminated with the filtered, modulated light, the area having a shape of the spectral signature.

13. The apparatus as defined in claim 10, wherein the spectral signature is input to the liquid crystal television through a controller.

14. The apparatus as defined in claim 10, wherein the spectral signature is input to the liquid crystal television through a computer in real time.

15. The apparatus as defined in claim 10, wherein the volume hologram outputs a word to the diffuser.

16. The apparatus as defined in claim 10, wherein the volume hologram outputs a symbol to the diffuser.

17. The apparatus as defined in claim 10, wherein the hologram includes a plurality of binary patterns recorded therein and outputting an optical identification includes outputting a plurality of optical identifications of the spectral signature by diffracting the filtered, modulated light through the plurality of binary patterns.

18. Apparatus for analyzing a spectral signature, comprising:

a laser;

a liquid crystal television connected to the laser, the liquid crystal television modulating light from the laser in accordance with spatial features of the spectral signature;

a 4f lens system upon which modulated light from the liquid crystal television is incident, the 4f lens system filtering unwanted diffraction orders from the modulated light;

a volume hologram having a focal plane, the volume hologram i) being illuminated with the filtered, modulated light from the 4f lens system, ii) including a binary pattern recorded therein, and iii) outputting an optical identification of the spectral signature by diffracting the filtered, modulated light through the binary pattern; and a detector array located at the focal plane of the volume hologram, the optical identification being incident upon the detector array.

19. The apparatus as claimed in claim 16, wherein the volume hologram outputs a spot to a location on the detector array.

20. The apparatus as defined in claim 18, wherein the volume hologram includes a plurality of binary patterns recorded therein and outputting an optical identification includes outputting a plurality of optical identifications of the spectral signature by diffracting the filtered, modulated light through the plurality of binary patterns.

21. The apparatus as defined in claim 18, wherein the liquid crystal television is controlled by a computer.

22. Apparatus for recording a hologram for use in an apparatus which identifies a spectral signature having spatial features, the apparatus for recording a hologram comprising:

a laser producing a laser beam;

a beam splitter connected to the laser, the beam splitter splitting the laser beam into an object beam and a reference beam, each of said object beam and said reference beam having a path;

a first collimation optic located in the path of the reference beam the first collimation optic collimating the reference beam;

a second collimation optic located in the path of the object beam the second collimation optic collimating the object beam;

a volume of holographic material located in the path of the reference beam and located in the path of the object beam;

a first mask connected to the first collimation optic, positionable in the path of the reference beam adjacent the volume of holographic material, having a cutout portion representing the spatial features of the spectral signature and delimiting an area of the volume of holographic material illuminated by the laser beam to a shape of the spectral signature;

a second mask connected to the second collimation optic, positionable in the path of the object beam and containing a cut-out portion representing an identification of the spectral signature; and a diffuser adjacent the second mask which diffuses light passing through the cut-out portion of the second mask, whereby the volume of holographic material is recorded with an interference between the object beam and reference beam such that an identification is recorded in the volume of holographic material within an area in the shape of the spectral signature.

23. The apparatus defined in claim 21, wherein the identification includes a symbol.

24. The apparatus as defined in claim 21, wherein the identification includes a word.

25. The apparatus as defined in claim 21, wherein the identification includes a spot.

26. The apparatus as defined in claim 21, further comprising a third mask connected to the first collimation optic, positionable in the path of the reference beam adjacent the volume of holographic material, having a cut-out portion representing the spatial features of a reciprocal of the spectral signature and delimiting an area of the volume of holographic material illuminated by the laser beam to a shape of the reciprocal of the spectral signature; and a fourth mask connected to the second collimation optic, positionable in the path of the object beam and containing a cut-out portion representing a negative identification of the spectral signature.

27. A method of analyzing a spectral signature of a constituent, comprising:

acquiring the spectral signature of the constituent;

modulating light from a laser light source in accordance with spatial features of the spectral signature of the constituent;

filtering the modulated light;

illuminating an area of a hologram in accordance with spatial features of the spectral signature with the filtered and modulated light, said hologram including a binary pattern recorded therein;

outputting an optical identification symbol from the hologram by diffracting the filtered and modulated light through the binary pattern; and detecting the optical identification symbol.

28. The method of claim 27, wherein outputting an optical identification includes outputting a plurality of identification symbols from the hologram.

* * * * *